US011999834B2

(12) United States Patent
Hilton et al.

(10) Patent No.: US 11,999,834 B2
(45) Date of Patent: Jun. 4, 2024

(54) PRECURSOR COMPOSITIONS FOR A PROTECTIVE ARTICLE, PROTECTIVE ARTICLES COMPRISING A REACTION PRODUCT OF THE PRECURSOR COMPOSITION, RELATED AEROSPACE STRUCTURES, AND RELATED METHODS

(71) Applicant: Northrop Grumman Systems Corporation, Falls Church, VA (US)

(72) Inventors: Cameron Hilton, Pleasant Grove, UT (US); Benjamin W. C. Garcia, Tremonton, UT (US); Matthew Armentrout, Salt Lake City, UT (US); Steven F. Stone, Irvine, CA (US); Christopher Deemer, Sandy, UT (US); Brian Barber, Xenia, OH (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 779 days.

(21) Appl. No.: 16/446,038

(22) Filed: Jun. 19, 2019

(65) Prior Publication Data

US 2020/0399436 A1 Dec. 24, 2020

(51) Int. Cl.
*C08J 9/00* (2006.01)
*B32B 5/18* (2006.01)
*B32B 5/32* (2006.01)
*B64C 7/00* (2006.01)
*C08J 9/228* (2006.01)

(52) U.S. Cl.
CPC .............. *C08J 9/0085* (2013.01); *B32B 5/18* (2013.01); *B32B 5/32* (2013.01); *B64C 7/00* (2013.01); *C08J 9/0066* (2013.01); *C08J 9/0071* (2013.01); *C08J 9/228* (2013.01);
(Continued)

(58) Field of Classification Search
CPC ...... C08J 9/0085; C08J 9/0066; C08J 9/0071; C08J 9/228; C08J 9/32; C08J 2203/22; C08J 2333/08; C08J 2201/026; C08J 2333/06; B32B 5/18; B32B 2266/0207; B32B 2605/18
See application file for complete search history.

(56) References Cited

U.S. PATENT DOCUMENTS 4,428,998 A 1/1984 Hawkinson
5,196,228 A 3/1993 Kirby et al.
(Continued)

FOREIGN PATENT DOCUMENTS

EP 2517960 A2 10/2012
FR 2713327 A1 6/1995

OTHER PUBLICATIONS

Dupont (TM) Vamac (R) GLS Ethylene Acrylic Elastomer—Technical Data, 2019. (Year: 2019).*
(Continued)

*Primary Examiner* — Hai Vo
(74) *Attorney, Agent, or Firm* — TraskBritt (57) ABSTRACT

A precursor composition comprising, before cure, an acrylic ethylene monomer (AEM), a foaming agent, and one or more of a strengthening additive, a thermal ablation additive, or a reflectivity additive. The precursor composition is cured to form a protective article comprising a foamed protective material. A method of forming a protective article is also disclosed, as is an aerospace structure comprising the foamed protective material.

26 Claims, 4 Drawing Sheets

(52) U.S. Cl.
CPC ... *B32B 2266/0207* (2013.01); *B32B 2605/18* (2013.01); *C08J 2203/22* (2013.01); *C08J 2333/08* (2013.01)

(56) References Cited

U.S. PATENT DOCUMENTS

| | | | |
|---|---|---|---|
| 5,413,023 | A | 5/1995 | Babel et al. |
| 5,425,973 | A | 6/1995 | Frangipane et al. |
| 6,743,504 | B1 | 6/2004 | Allen et al. |
| 7,556,854 | B2 | 7/2009 | Farkas et al. |
| 7,854,967 | B2 | 12/2010 | Keener et al. |
| 8,460,777 | B2 | 6/2013 | Long |
| 9,255,197 | B2 | 2/2016 | Leufgens et al. |
| 9,640,288 | B1 | 5/2017 | Wong |
| 9,685,710 | B1 | 6/2017 | Hijmans et al. |
| 11,077,627 | B2 | 8/2021 | Stone et al. |
| 2005/0211930 | A1 | 9/2005 | Demeo et al. |
| 2006/0160932 | A1 | 7/2006 | Taylor et al. |
| 2007/0110977 | A1 | 5/2007 | Al-Haik et al. |
| 2007/0194256 | A1 | 8/2007 | Srobel et al. |
| 2007/0254971 | A1* | 11/2007 | De Vogel ............... B29C 70/66 521/59 |
| 2011/0014356 | A1 | 1/2011 | Fornes et al. |
| 2011/0021651 | A1* | 1/2011 | Mayeres ................ C08K 3/02 521/85 |
| 2012/0175467 | A1 | 7/2012 | Dye et al. |
| 2012/0273622 | A1 | 11/2012 | Long |
| 2013/0149934 | A1 | 6/2013 | Sang et al. |
| 2013/0161564 | A1 | 6/2013 | Churhill et al. |
| 2013/0178566 | A1* | 7/2013 | Blume ................. C08K 5/5435 524/114 |
| 2013/0287984 | A1 | 10/2013 | Kemp |
| 2013/0340601 | A1 | 12/2013 | Townsend et al. |
| 2014/0144568 | A1 | 5/2014 | MacAdams et al. |
| 2015/0044488 | A1 | 2/2015 | Nesbitt |
| 2015/0048209 | A1 | 2/2015 | Hoyt et al. |
| 2015/0056433 | A1 | 2/2015 | MacAdams et al. |
| 2015/0203668 | A1* | 7/2015 | Bedard ..................... C08L 7/00 523/156 |
| 2016/0362565 | A1 | 12/2016 | Fornes et al. |
| 2017/0080685 | A1 | 3/2017 | Palmieri et al. |
| 2018/0171105 | A1* | 6/2018 | Börger ................. C08L 15/005 |
| 2019/0047234 | A1* | 2/2019 | Stone ...................... B64G 1/58 |
| 2019/0120174 | A1 | 4/2019 | Gajiwala et al. |
| 2020/0332080 | A1* | 10/2020 | Otani ................. C08L 23/0869 |

OTHER PUBLICATIONS

International Search Report for International Application No. PCT/US2020/036301, mailed Sep. 17, 2020, 5 pages.
International Written Opinion for International Application No. PCT/US2020/036301, mailed Sep. 17, 2020, 3 pages.
DuPont™ Vamac® Fluid Resistance, Technical Information—Rev. 2, Aug. 2010, 8 pages.
DuPont™ Vamac® Compounding Processing Guide—Vamac® Dipolymers, Technical Information, Rev. 3, Jul. 2010, 6 pages.
European Communication pursuant to Article 94(3) EPC for European Application No. 18765247.4, dated Apr. 21, 2021, 6 pages.

* cited by examiner

PRECURSOR COMPOSITIONS FOR A PROTECTIVE ARTICLE, PROTECTIVE ARTICLES COMPRISING A REACTION PRODUCT OF THE PRECURSOR COMPOSITION, RELATED AEROSPACE STRUCTURES, AND RELATED METHODS

CROSS-REFERENCE TO RELATED APPLICATIONS

This application is related to U.S. patent application Ser. No. 16/103,428, now U.S. Pat. No. 11,077,627, issued Aug. 3, 2021, and entitled "MULTI-FUNCTIONAL PROTECTIVE ASSEMBLIES, SYSTEMS INCLUDING PROTECTIVE ASSEMBLIES, AND RELATED METHODS," which claims the benefit under 35 U.S.C. § 119(e) of U.S. Provisional Patent Application Serial No. 62/545,340, filed Aug. 14, 2017, the disclosure of each of which is hereby incorporated herein in its entirety by this reference.

TECHNICAL FIELD

The disclosure, in various embodiments, relates generally to precursor compositions and protective materials formed from the precursor compositions for shielding (e.g., protecting) an underlying structure, such as, for example, an aircraft or a spacecraft (e.g., an aerospace structure), to protective articles including the protective materials, and to methods of forming the precursor compositions and protective materials.

BACKGROUND

Aerospace structures, such as aircraft and spacecraft, typically have an external protection system to endure launch, in-flight, and space environments. These environments may subject the aerospace structure to impact with foreign objects, such as rain, birds, rocks, dirt, micrometeoroids, and other orbital debris, that may damage the aerospace structure. These foreign objects may impact the aerospace structure at subsonic velocities, such as at about 0.3 km/second, and at hypersonic velocities, such as at least at 3 km/second. Furthermore, the aerospace structure may be exposed to aerodynamic heat from atmospheric friction generated during launch and flight. The aerospace structure may also be exposed to radiation (e.g., heat) created by thermal flash, solar, and nuclear burst induced radiation, so-called "advanced threat" radiation as may be produced by directed-energy weapons and the like encountered by the aerospace structure during flight. Additionally, the aerospace structure may be subject to damage by electromagnetic phenomena, such as electromagnetic pulses and lightning strikes. In addition to providing inadequate protection for all launch, in-flight, and space environments, conventional protection systems are extremely heavy and/or expensive.

To provide thermal protection to the aerospace structure, conventional protective articles have included cork, engineered cork-based materials, or un-foamed rubber materials. Engineered cork-based materials are known in the art and include cork and a binder (e.g., matrix), such as a phenolic adhesive. While the cork or engineered cork-based material provides some degree of thermal protection in aeroheating environments, mechanical properties of the cork or cork-based material are not sufficient for all launch, in-flight, and space environments, such as the more aggressive environments that future aerospace structure will be exposed to. Therefore, these conventional protection systems have limited functionality. The protection system may be at least partially damaged during operation of the aerospace structure, directly exposing the aerospace structure to the launch, in-flight, and space environments. Since cork is a natural material, there is variability in the thermal or insulative properties of the cork or cork-based material, which leads to unpredictability in these properties. Crop yields of cork may also fluctuate, leading to insufficient reliability for these conventional protection systems to be used in commercial production of the aerospace structure. Other conventional protection systems have included ethylene propylene diene monomer- or urethane-based materials. However, these materials do not provide sufficient protective properties to the aerospace structure for use in the more aggressive environments.

BRIEF SUMMARY

In some embodiments, a precursor composition is disclosed. The precursor composition comprises, before cure, an acrylic ethylene monomer (AEM), a foaming agent, and one or more of a strengthening additive, a thermal ablation additive, an x-ray absorption additive, or a reflectivity additive.

In other embodiments, a protective article is disclosed and comprises a foamed protective material comprising a reaction product of an AEM, expanded microspheres, and one or more of a strengthening additive, a thermal ablation additive, or a reflectivity additive. The foamed protective material exhibits a density of from about 0.1 g/ml to about 1.0 g/ml.

In yet other embodiments, a method of forming a protective article is disclosed. The method comprises forming a precursor composition and exposing the precursor composition to heat to form a foamed protective article. The precursor composition comprises an AEM, expandable microspheres, and one or more additives.

In still yet other embodiments, an aerospace structure is disclosed and comprises a protective article on at least a portion of an external surface of an aerospace structure. The protective article comprises a foamed protective material comprising a reaction product of an AEM, expanded microspheres, and one or more additives.

BRIEF DESCRIPTION OF THE DRAWINGS

While the specification concludes with claims particularly pointing out and distinctly claiming what are regarded as embodiments of the disclosure, various features and advantages of embodiments of the disclosure may be more readily ascertained from the following description of example embodiments of the disclosure when read in conjunction with the accompanying drawings, in which:

DETAILED DESCRIPTION

A precursor composition for a protective material is disclosed. The precursor composition includes, before cure, an acrylic ethylene monomer (AEM), a foaming agent, and one or more additives that provide one or more of mechanical strength, thermal ablation resistance, or electromagnetic radiation absorption (e.g., reflectivity) properties to the protective material. The precursor composition is cured (e.g., crosslinked) to form the protective material as a foam (e.g., a foamed protective material). The density of the foamed protective material may be tailored depending on the intended use of the foamed protective material. Depending on the specific precursor composition, the foamed protective material may exhibit a low density and a low mass compared to cork or engineered cork-based materials. The foamed protective material may be used as a protective article of an aerospace structure, protecting against environmental (e.g., conditions in the environment of use) conditions or from deliberate (e.g., manmade) threats or attacks. The foamed protective material may protect the aerospace structure from conditions that occur during flight, environmental conditions, and/or manmade threats. The environmental conditions may include, but are not limited to, thermal (e.g., aeroheating), weather (e.g., lightning strikes, hail, rain), foreign object impact (e.g., pebbles, rocks, dirt, dust, birds, micro-meteoroids). The deliberate threats may include, but are not limited to, radiation, impact, thermal flash, electromagnetic pulses, a directed energy weapon, and/or other manmade threats. The foamed protective material has a higher strength and comparable or increased protective properties compared to the cork or engineered cork-based materials. The foamed protective material also exhibits a density comparable to or lower than that of the cork or engineered cork-based materials, with the density being tailorable depending on an amount of the foaming agent in the precursor composition and/or processing conditions used to produce the foamed protective material. Since the foamed protective material exhibits a low mass and a low density, the foamed protective material may be used as a lightweight protective article in place of cork, engineered cork-based materials, or ethylene propylene diene monomer (EPDM)- or urethane-based protective materials. The foamed protective material also has a lower cost, a lower material variability, and a more reproducible supply compared to cork or engineered cork-based materials. The foamed protective material may be used alone as the protective article or as part of a multilayer protective article.

The illustrations presented herein are not actual views of any particular foamed protective material, protective article (e.g., shield), or aerospace structure, but are merely idealized representations employed to describe example embodiments of the disclosure. The following description provides specific details of embodiments of the disclosure in order to provide a thorough description thereof. However, a person of ordinary skill in the art will understand that the embodiments of the disclosure may be practiced without employing many such specific details. Indeed, the embodiments of the disclosure may be practiced in conjunction with conventional techniques employed in the industry. In addition, the description provided below does not include all elements to form a complete aerospace structure or assembly. Only those process acts and structures necessary to understand the embodiments of the disclosure are described in detail below. Additional conventional acts and structures may be used. Also note, any drawings accompanying the application are for illustrative purposes only, and are thus not drawn to scale. Additionally, elements common between figures may have corresponding numerical designations.

As used herein, the term "aerospace structure" is used to collectively refer to aircraft, spacecraft, satellites, rockets, missiles, or other movable or stationary structures for use in Earth's atmosphere and/or surrounding space outside Earth's atmosphere.

As used herein, the term "aircraft" means and includes vehicles or devices designed for travel or operation inside the earth's atmosphere.

As used herein, the singular forms following "a," "an," and "the" are intended to include the plural forms as well, unless the context clearly indicates otherwise.

As used herein, the term "about" or "approximately" in reference to a numerical value for a particular parameter is inclusive of the numerical value and a degree of variance from the numerical value that one of ordinary skill in the art would understand is within acceptable tolerances for the particular parameter. For example, "about" or "approximately" in reference to a numerical value may include additional numerical values within a range of from 90.0 percent to 110.0 percent of the numerical value, such as within a range of from 95.0 percent to 105.0 percent of the numerical value, within a range of from 97.5 percent to 102.5 percent of the numerical value, within a range of from 99.0 percent to 101.0 percent of the numerical value, within a range of from 99.5 percent to 100.5 percent of the numerical value, or within a range of from 99.9 percent to 100.1 percent of the numerical value.

As used herein, the term "and/or" includes any and all combinations of one or more of the associated listed items.

As used herein, spatially relative terms, such as "beneath," "below," "lower," "bottom," "above," "upper," "top," "front," "rear," "left," "right," and the like, may be used for ease of description to describe one element's or feature's relationship to another element(s) or feature(s) as illustrated in the figures. Unless otherwise specified, the spatially relative terms are intended to encompass different orientations of the materials in addition to the orientation depicted in the figures. For example, if materials in the figures are inverted, elements described as "below" or "beneath" or "under" or "on bottom of" other elements or features would then be oriented "above" or "on top of" the other elements or features. Thus, the term "below" can encompass both an orientation of above and below, depending on the context in which the term is used, which will be evident to one of ordinary skill in the art. The materials may be otherwise oriented (e.g., rotated 90 degrees, inverted, flipped) and the spatially relative descriptors used herein interpreted accordingly.

As used herein, the terms "comprising," "including," "containing," "characterized by," and grammatical equivalents thereof are inclusive or open-ended terms that do not exclude additional, unrecited elements or method steps, but also include the more restrictive terms "consisting of" and "consisting essentially of" and grammatical equivalents thereof.

As used herein, the term "configured" refers to a size, shape, material composition, and arrangement of one or more of at least one aerospace structure and at least one apparatus facilitating operation of one or more of the aerospace structure and the apparatus in a predetermined way.

As used herein, the term "foam" refers to a material including a dispersion of gas bubbles (e.g., pores) in a continuous medium, such as in a solid medium or a liquid medium. The foam may include open cells and/or closed cells.

As used herein, the term "low density" means and includes a density of less than or equal to about 1.0 g/ml.

As used herein, the term "may" with respect to a material, structure, feature, or method act indicates that such is contemplated for use in implementation of an embodiment of the disclosure, and such term is used in preference to the more restrictive term "is" so as to avoid any implication that other compatible materials, structures, features and methods usable in combination therewith should or must be excluded.

As used herein, the term "protective article" is used to collectively refer to a foamed protective material when used alone or when used as part of a multilayer protective article.

As used herein, the term "spacecraft" may mean and include vehicles or devices designed for travel or operation outside the Earth's atmosphere.

As used herein, the term "substantially" in reference to a given parameter, property, or condition means and includes to a degree that one of ordinary skill in the art would understand that the given parameter, property, or condition is met with a degree of variance, such as within acceptable manufacturing tolerances. By way of example, depending on the particular parameter, property, or condition that is substantially met, the parameter, property, or condition may be at least 90.0% met, at least 95.0% met, at least 99.0% met, or even at least 99.9% met.

The acrylic ethylene monomer (AEM) may be used as a base (e.g., a primary) polymer of the precursor composition. The AEM is also known in the art as an ethylene acrylic elastomer, ethylene acrylic polymer, ethylene acrylate, or ethylene-carboxyl copolymer. The AEM may be cured (e.g., crosslinked) through a chemical reaction or irradiation by a curing agent. The AEM may be a dipolymer of ethylene and an alkyl acrylate, such as methyl acrylate, ethyl acrylate, or butyl acrylate. Alternatively, the AEM may be a terpolymer of ethylene, the alkyl acrylate (e.g., methyl acrylate), and an acidic cure site monomer, such as a monomer containing at least one carboxylic acid group. The terpolymer of the AEM may include a higher acrylic content (e.g., more acrylic acid sites) than the dipolymer of the AEM, enabling the AEM to be utilized at a high temperature. Using the AEM terpolymer may provide a better crosslink density and, therefore, improved high temperature performance compared to the AEM dipolymer. The AEM may include an acrylic content of from about 40% by weight (wt %) to about 90 wt % based on a total weight of the AEM, such as from about 40 wt % to about 80 wt %, from about 40 wt % to about 75 wt %, from about 45 wt % to about 70 wt %, from about 50 wt % to about 65 wt %, or from about 55 wt % to about 65 wt %. In some embodiments, the AEM used in the precursor composition is a terpolymer and has a higher acrylic content than the dipolymer.

The AEM is formulated to exhibit a mooney viscosity (ML 1+4) at 100° C. (212° F.) of between about 15 ML and about 35 ML, such as between about 23 ML and about 35 ML, between about 25 ML and about 34 ML, between about 27 ML and about 33 ML, or between about 28 ML and about 32 ML. The AEM is formulated to exhibit a glass transition temperature ($T_g$) of between about −40° C. and about −20° C. The AEM may be selected to be compatible with high temperature process conditions, such as at a temperature of greater than about 100° C., greater than about 150° C., greater than about 200° C., greater than about 215° C., greater than about 250° C., or greater than about 300° C.

The AEM may be commercially available and includes those available from DuPont (Wilmington, Del.) under the trade name VAMAC®. By way of example only, the AEM may include, but is not limited to, VAMAC® Ultra DX, VAMAC® Ultra XF, VAMAC® Ultra IP, VAMAC® Ultra HT, VAMAC® Ultra HT-OR, VAMAC® Ultra LS, VAMAC® Ultra LT, or combinations thereof. In some embodiments, the AEM is VAMAC® Ultra HT. Additional AEM materials may be commercially available from Zeon Chemicals L.P. (Tokyo, Japan) under the trade name HYTEMP®, or from Kuraray Co., Ltd. (Sakazu, Japan) under the trade name KURARITY®.

The AEM may be present in the precursor composition from about 50.0 wt % to about 80.0 wt %, such as from about 65.0 wt % to about 80.0 wt %, from about 68.0% wt % to about 78.0 wt %, or from about 70.0% wt % to about 75.0 wt %. The AEM may also be used in combination with another polymer or polymers, such as a silicone rubber, an ethylene propylene diene monomer (EPDM) rubber, or a styrene block-based thermoplastic elastomer.

The foaming agent of the precursor composition may include, but is not limited to, a chemical blowing agent, a lightweight filler, or an expandable material. The chemical blowing agent and expandable foaming agent is formulated to be activated by exposing the precursor composition to heat during processing of the precursor composition. The lightweight filler may be added during mixing, providing syntactic foamed materials without any additional processing acts. The foaming agent may be compatible with the process conditions of the precursor composition, such as with a temperature to which the precursor composition is exposed during processing. In some embodiments, the foaming agent includes the expandable material.

The chemical blowing agent may be a gas or a chemical compound that produces a gas or gases (e.g., carbon dioxide ($CO_2$), nitrogen ($N_2$)) following exposure of the precursor composition to heat. For example, the chemical blowing agent may produce the gas or gases when exposed to a temperature above an activation temperature or decomposition temperature of the chemical blowing agent, such as to a cure temperature of the precursor composition. The chemical blowing agent may include, but is not limited to, water, hydrazide, diphenyloxide-4,4-disulphohydrazide, carbonamide, azocarbonamide, hexamethylene diamine carbamate, sodium bicarbonate, dimethyl ether, methylene chloride, carbon dioxide, a fluorocarbon such as difluoroethane, tetrafluoroethane, or HFC-4310, an azeotrope thereof, or an isomer thereof, and a hydrocarbon such as isobutane, butane, propane, pentane, isopentane, an alcohol thereof, or an isomer thereof.

The lightweight filler used as the foaming agent may include hollow microspheres made with glass, carbon, or ceramic walls. Alternatively, the lightweight filler may be pre-expanded hollow polymer microspheres, which are made by heating an expandable material to create a lightweight filler that utilizes no further processing to make a foamed material other than through addition into the matrix. These foams are termed syntactic foams and are made through a mixing process only.

The expandable material used as the foaming agent may include expandable microspheres that have a polymer shell (e.g., a thermoplastic shell) encapsulating a gas or a volatile liquid. The gas or volatile liquid in the shell may expand between about 50 times in volume and about 100 times in volume when the precursor composition is exposed to the activation temperature. The activation temperature may be at or above a boiling point of the gas or volatile liquid. As the precursor composition is heated, the gas or volatile liquid expands, causing the pressure within the shell of the expandable microspheres to increase. Substantially simultaneously, the shell may soften (e.g., melt) and an outer diameter may increase due to the increased pressure within the shell. The expandable microspheres may be selected to exhibit an activation temperature between about 80° C. and about 235° C. By selecting the expandable microspheres to expand at or around the cure temperature of the precursor composition, the expandable microspheres may be used to produce the protective material as a foam. The expandable microspheres may also be selected from various sizes that are formulated to include a larger amount of gas or volatile liquid or a smaller amount of gas or volatile liquid, enabling a pore size of the foamed protective material to be tailored. Expandable microspheres are commercially available from numerous sources including, but not limited to, Nouryon (Amsterdam, the Netherlands) under the EXPANCEL® tradename, Sekisui Chemical Co., Ltd. (Osaka, Japan) under the Advancell tradename, or Chase Corp., (Westwood, Mass.) under the DUALITE® tradename. In some embodiments, the foaming agent is EXPANCEL® 920 DU 120. The expandable microspheres present in the precursor composition may be substantially unexpanded before cure or may be partially expanded. The expandable microspheres may also function as a filler in the precursor composition.

The foaming agent may be present in the precursor composition at from about 2.0 wt % to about 50.0 wt %, such as from about 2.0 wt % to about 20.0 wt %, from about 2.0 wt % to about 10.0 wt %, from about 2.8 wt % to about 7.4 wt %, about 2.9 wt % to about 7.0 wt %, from about 3.0 wt % to about 6.5 wt %, from about 3.2 wt % to about 6.3 wt %, from about 3.6 wt % to about 6.0 wt %, from about 4.0 wt % to about 6.0 wt %, from about 4.5 wt % to about 6.0 wt %, from about 5.0 wt % to about 6.0 wt %, from about 5.5 wt % to about 6.5 wt %, or from about 4.0 wt % to about 4.5 wt %.

The additive in the precursor composition may include one or more of a strengthening additive, a thermal ablation additive, an x-ray absorption additive, or a reflectivity additive. Depending on the additive(s) present in the precursor composition, one or more of mechanical strength, thermal ablation resistance, and reflectivity properties of the foamed protective material may be improved relative to the properties of cork or engineered cork-based materials. The additive(s) may also function as a filler in the foamed protective material. Desired properties of the foamed protective material may, therefore, be tailored by appropriately selecting the additive(s).

The strengthening additive may include, but is not limited to, fibers (e.g., chopped fibers) of carbon, aramid, glass, metal, quartz, ceramic, or combinations thereof. The fibers may be carbon fibers, polyaramid (e.g., polyimide) fibers, or combinations thereof. Such fibers are commercially available from numerous sources including, but not limited to, DuPont (Wilmington, Del.) under the KEVLAR® tradename, such as KEVLAR® brand pulp 1F538 Merge Type 979. Nanomaterial particles, such as nanotubes, platelets, rods, or disks formed of carbon, glass, metal, ceramic, or combinations thereof, may also be used as the strengthening additive. For example, the strengthening additive may include, but is not limited to, carbon nanotubes, graphene, carbon black, fumed silica, precipitated silica, or combinations thereof. Such nanomaterial particles are commercially available from numerous sources including, but not limited to, precipitated silica from PPG Industries, Inc. (Pittsburgh, Pa.), which is sold under the HI-SIL® tradename, and fumed silica from Cabot Corp. (Boston, Mass.), which is sold under the CAB-O-SIL® tradename, such as CAB-0-SIL® M-7D. Depending on the strengthening additive used, the strengthening additive may also provide increased ablation properties. In some embodiments, the strengthening additive includes fibers, such as polyimide fibers. In other embodiments, the strengthening additive includes precipitated silica. In yet other embodiments, the strengthening additive includes polyimide fibers and precipitated silica. The strengthening additive and/or thermal ablation additive may also function as a filler in the precursor composition.

The reflectivity additive may be boron nitride, titanium oxide, or combinations thereof. Boron nitride is commercially available from numerous sources including, but not limited to, Momentive Performance Materials Inc. (Waterford, N.Y.). In some embodiments, the reflectivity additive is boron nitride and is commercially available from Momentive Performance Materials Inc. (Waterford, N.Y.) as AC6111. The reflectivity additive may also function as a filler in the precursor composition.

The one or more additive may be present in the precursor composition at from about 0.5 wt % to about 50.0 wt %, such as from about 0.5 wt % to about 40.0 wt %, from about 2.0 wt % to about 20.0 wt %, from about 2.0 wt % to about 18.0 wt %, from about 4.0 wt % to about 17.0 wt %, from about 6.0 wt % to about 16.0 wt %, from about 8.0 wt % to about 16.0 wt %, from about 10.0 wt % to about 16.0 wt %, from about 12.0 wt % to about 16.0 wt %, from about 12.0 wt % to about 15.0 wt %, or from about 14.0 wt % to about 16.0 wt %.

The precursor composition may also include a curing agent and, optionally, a cure accelerator. The curing agent may be a diamine curing agent, a peroxide curing agent, or combinations thereof. If the AEM is a terpolymer, the curing agent may be the diamine curing agent. By way of example only, the diamine curing agent may be 4,4'-methylene-bis-(cyclohexylamine) carbamate, ethylene diamine, ketamine, or triethylenetetramine. Diamine curing agents are commercially available from numerous sources including, but not limited to, Vanderbilt Chemicals, LLC (Norwalk, Conn.) under the DIAK® tradename, such as DIAK® No. 1. If the AEM is a dipolymer, the curing agent may be the peroxide curing agent. Examples of peroxide curing agents include, but are not limited to, dicumyl peroxide, di-tert-butyl peroxide, 2,5-di-(tert-butylperoxy)hexane, 2,5-dimethyl-2,5-di-(tert-butylperoxy)hexane, 2,5-dimethyl-2,5-di-(tert-butylperoxy)hexyne-3, 1,3-bis(tert-butylperoxyisopropyl)benzene, 1,1-bis(tert-butylperoxy)-3,3,5-trimethylcyclohexane, n-butyl-4,4-bis(tert-butylperoxy)valerate, peroxybenzoate, p-chloroperoxybenzoate, 2,4-dichloroperoxybenzoate, tert-butylperoxybenzoate, tert-butylperoxyisopropylcarbonate, diacetyl peroxide, lauroyl peroxide, tert-butylcumyl peroxide, or combinations thereof. In some embodiments, the curing agent is dicumyl peroxide. Peroxide curing agents are commercially available from numerous sources including, but not limited to, Arkema Inc. (King of Prussia, Pa.) under the DI-CUP® tradename, such as DI-CUP® 40C. The curing agent may be present in the precursor composition at from about 1.0 wt % to about 5.0 wt %, such as from about 1.5 wt % to about 4.5 wt %, from about 1.5 wt % to about 4.0 wt %, from about 1.5 wt % to about 3.5 wt %, from about 2.0 wt % to about 5.0 wt %, from about 2.0 wt % to about 4.5 wt %, from about 2.0 wt % to about 4.0 wt %, from about 2.0 wt % to about 3.5 wt %, from about 2.0 wt % to about 3.0 wt %, from about 2.5 wt % to about 4.5 wt %, from about 2.5 wt % to about 4.0 wt %, from about 2.5 wt % to about 3.5 wt %, from about 3.0 wt % to about 4.5 wt %, from about 3.0 wt % to about 4.0 wt %, or from about 3.5 wt % to about 4.0 wt %.

The cure accelerator, if present, may be a diamine cure accelerator, a peroxide cure accelerator, or combinations thereof. By way of example only, the cure accelerator for the peroxide curing agent may include, but is not limited to, N,N'-m-phenylenedimaleimide, which is commercially available from Vanderbilt Chemicals, LLC (Norwalk, Conn.) under the VANAX® tradename, such as VANAX® MBM HVA-2, By way of example only, the cure accelerator for the diamine curing agent may be a guanidine compound including, but not limited to, di-ortho-tolyl guanidine (DOTG), diphenyl guanidine, or combinations thereof. DOTG is commercially available from numerous sources including, but not limited to, MLPC International (Arkema) (Rion des Landes, France). The cure accelerator, if present, may be present in the precursor composition at from about 0.5 wt % to about 5.0 wt %, such as from about 0.5 wt % to about 2.5 wt %, from about 1.0 wt % to about 4.8 wt %, from about 1.2 wt % to about 4.8 wt %, from about 1.4 wt % to about 4.8 wt %, from about 1.2 wt % to about 4.6 wt %, from about 1.2 wt % to about 4.5 wt %, or from about 1.3 wt % to about 4.4 wt %.

The precursor composition may also optionally include one or more of an antioxidant, a processing aid, or combinations thereof. Examples of the antioxidant include, but are not limited to, 4-(1-methyl-1-phenylethyl)N-[4-(1-methyl-1-phenylethyl)phenyl] aniline (aka 4,4'-bis($\alpha,\alpha$-dimethylbenzyl)diphenylamine), phenylbutylamine, N,N-di-2-naphthyl-p-phenylenediamine, 2,2,4-trimethyl-1,2-dihydroquinoline polymer, dibutylhydroxytoluene, tetrakis[methylene(3,5-di-t-butyl-4-hydroxy)hydrocinnamate]methane, bis[2-methyl-4-(3-n-alkylthiopropionyloxy)-5-t-butylphenyl]sulfide, nickel dibutyldithiocarbamate, zinc salts of 2-mercaptobenzoylimidazole and 2-mercaptobenzoimidazole, dilaurylthiodipropionate, distearylthiodipropionate, other antioxidant, or combinations thereof. Such antioxidants are commercially available from numerous sources including, but not limited to, NAUGARD® 445 from Addivant USA, LLC (Danbury, Conn.). The antioxidant, if present, may be an aromatic amine, such as a diphenyl amine. In some embodiments, the antioxidant is 4-(1-methyl-1-phenylethyl)N-[4-(1-methyl-1-phenylethyl) phenyl] aniline.

The processing aid, if present, may be an organic phosphate ester free acid, such as a polyoxyethylene octadecyl ether phosphate, stearic acid, a fatty acid phosphate, or combinations thereof. Such processing aids are commercially available from numerous sources including, but not limited to, polyoxyethylene octadecyl from Vanderbilt Chemicals, LLC (Norwalk, Conn.) under the VANFRE® tradename, such as VANFRE® VAM, stearic acid, and a combination of fatty acid phosphate derivatives from Struktol Company of America, LLC (Stow, Ohio) as HPS 11.

The AEM, the foaming agent, the one or more additives, the curing agent, and any optional ingredients may be combined and mixed by conventional techniques to form the precursor composition. If the expandable material is used as the foaming agent, the expandable material may be used in either a substantially unexpanded form or an expanded form depending on processing conditions. The remaining ingredients may be used in as-received forms.

The precursor composition may be foamed (e.g., the foaming agent is activated) and cured (e.g., the AEM is crosslinked) to form the foamed protective material. The activation of the foaming agent and the crosslinking of the AEM may occur substantially simultaneously, the foaming agent may be activated followed by substantially crosslinking the AEM, or the AEM may be partially crosslinked, followed by activation of the foaming agent, and subsequent completion of the crosslinking of the AEM. The precursor composition may, therefore, be subjected to a foaming act and one or more curing (e.g., crosslinking) acts. To produce a uniform distribution of cells in the foamed protective material and reduce processing challenges, if the chemical blowing agent is used as the foaming agent, the AEM may be crosslinked before gas bubbles produced by the chemical blowing agent coalesce into larger gas bubbles. If the expandable material is used as the foaming agent, the expandable microspheres may be expanded and the AEM may be crosslinked around the expanded microspheres to produce the foamed protective material having the uniform distribution of cells. In some embodiments, the expandable material is used as the foaming agent to produce the resulting foamed protective material having a substantially uniform distribution of bubbles. It was unexpected and surprising that using the expandable material produced the foamed protective material having such a substantially uniform distribution of pores as well as a substantially uniform composition. In comparison, foaming the precursor composition using the chemical blowing agent resulted in a foamed protective material having a less uniform distribution of pores. In addition, the precursor composition including the chemical blowing agent was harder to cure in a desirable timeframe because the gas bubbles produced by the chemical blowing agent coalesced into large gas bubbles during the cure.

The precursor composition may be formed (e.g., calendared) into a desired configuration, such as a sheet, and then foamed and cured to form the foamed protective material. Calendaring of the precursor composition may be conducted by conventional techniques. Alternatively, the foamed protective material may be calendared into the desired configuration. Forming the precursor composition into the desired configuration may be conducted by conventional techniques. A thickness of the foamed protective material may be tailored by adjusting the amount of foaming agent in the precursor composition or by placing the calendared precursor composition between solid materials, such as other materials of a multilayer protective article or plates that are spaced apart a standoff distance, before conducting the foaming act. The standoff distance substantially corresponds to the desired thickness of the foamed protective material. As the calendared precursor composition is foamed, its thickness increases until the foamed protective material contacts the solid materials and is constrained from further expansion. The thickness of the foamed protective material may be also be affected by an initial thickness of the calendared precursor composition.

The foaming act and curing act may include exposing the precursor composition to heat (e.g., a heating act, a curing act) for an amount of time sufficient to foam and/or cure the precursor composition. The precursor composition may be exposed to one or more heating acts (e.g., curing acts), such as heating the precursor composition to one or more temperatures to produce the foamed protective material. If the foaming agent is the chemical blowing agent, the one or more temperatures of the heating act may be sufficiently high to form the gases or gases and cure the AEM. If the foaming agent is the expandable material, the one or more temperatures of the heating act may be sufficiently high to expand the expandable material from its substantially unexpanded state to a substantially expanded state. An initial heating act may be conducted to activate the foaming agent in the precursor composition, followed by a post-cure heating act to substantially crosslink the AEM. Alternatively, a single heating act may be conducted to both activate the foaming agent and substantially crosslink the AEM. A first temperature to which the precursor composition is heated may be sufficient to activate the foaming agent and a second temperature may be sufficient to cure the AEM. Alternatively, the precursor composition may be subjected to a single temperature that is sufficient to activate the foaming agent and cure the AEM. The precursor composition may be formed into the foamed protective material during the crosslinking act if the precursor composition is heated to a temperature sufficient to activate the foaming agent and for an amount of time sufficient to activate the foaming agent.

The heating acts may be conducted at a temperature of from about 121° C. (about 250° F.) to about 232° C. (about 450° F.), such as from about 149° C. (about 300° F.) to about 232° C. (about 450° F.), from about 177° C. (about 350° F.) to about 232° C. (about 450° F.), from about 204° C. (about 400° F.) to about 232° C. (about 450° F.), from about 121° C. (about 250° F.) to about 204° C. (about 400° F.), from about 121° C. (about 250° F.) to about 177° C. (about 350° F.), from about 121° C. (about 250° F.) to about 149° C. (about 300° F.), or from about 149° C. (about 300° F.) to about 204° C. (about 400° F.). However, the temperature of the one or more heating acts may be above or below this temperature range if a cure time is decreased or increased, respectively. In embodiments where the expandable material is used as the foaming agent, the precursor composition may be exposed to more than one heating act, such as exposing the precursor composition to a temperature of about 315° F. (about 157° C.) to expand the expandable material and then to a temperature of greater than or equal to about 350° F. (greater than or equal to about 177° C.) to substantially cure (e.g., crosslink) the AEM. The precursor composition is exposed to these heating acts for an amount of time sufficient to expand the expandable material and crosslink the AEM of the precursor composition.

After conducting the foaming act and the one or more curing acts, the density of the resulting foamed protective material may be lower than that of cork, engineered cork-based materials (e.g., P50 cork), or other conventional (e.g., not AEM based) protective materials. The density of the protective material (e.g., the foamed protective material) according to embodiments of the disclosure may be tailored from about 0.1 g/ml to about 1.0 g/ml, such as from about 0.1 g/ml to about 0.5 g/ml, from about 0.1 g/ml to about 0.4 g/ml, from about 0.1 g/ml to about 0.3 g/ml, from about 0.2 g/ml to about 0.5 g/ml, from about 0.2 g/ml to about 0.4 g/ml, from about 0.5 g/ml to about 1.0 g/ml, from about 0.5 g/ml to about 0.9 g/ml, from about 0.5 g/ml to about 0.8 g/ml, from about 0.5 g/ml to about 0.7 g/ml, from about 0.6 g/ml to about 1.0 g/ml, from about 0.6 g/ml to about 0.8 g/ml, or from about 0.7 g/ml to about 0.9 g/ml. In some embodiments, the foamed protective material exhibits a density of about 0.3 g/ml. For comparison, cork has a density of about 0.24 g/ml and engineered cork-based materials have a density of from about 0.48 g/ml to about 0.52 g/ml.

The density of the foamed protective material according to embodiments of the disclosure may also be affected by an initial thickness of the calendared precursor composition. By forming the calendared precursor composition and then foaming the calendared precursor composition, a lower density foamed protective material may be produced. The degree (e.g., extent) of foaming for a calendared precursor composition is determined by confining growth of the foam in a transverse direction. More confinement in the transverse direction during foaming may result in a higher density, protective material post-cure. In contrast, less confinement in the transverse direction during foaming may result in a lower density, protective material post-cure. By foaming the protective material, the density of the foamed protective material may be low (i.e., less than or equal to about 1.0 g/ml) rather than merely providing impact protection to the aerospace structure.

The thermal ablation resistance properties of the foamed protective material may be comparable to or greater than those of cork or engineered cork-based materials, and comparable to or greater than those of foamed urethane- or EPDM-based materials, which have low thermal ablation resistance. To achieve higher thermal ablation resistance properties, the foamed protective material may be formulated and configured to exhibit a density of from about 0.5 g/ml to about 1.0 g/ml. If, however, less stringent thermal ablation resistance properties are sufficient in the protective article, the foamed protective material may be formulated and configured to exhibit a lower density, such as a density of less than about 0.5 g/ml, such as from about 0.1 g/ml to about 0.5 g/ml. To achieve lower thermal conductivity properties, the foamed protective material may be formulated and configured to exhibit a density of from about 0.1 g/ml to about 0.5 g/ml. If, however, less stringent thermal conductivity properties are sufficient in the protective article, the foamed protective material may be formulated and configured to exhibit a higher density, such as a density greater than about 0.5 g/ml. The thermal ablation resistance properties and the thermal conductivity properties of the foamed protective material may, therefore, be tailored depending on the intended use of the foamed protective material.

The mechanical properties (e.g., tear strength, elongation, flatwise tension) of the foamed protective material may be comparable to or greater than those of cork or engineered cork-based materials, and may be improved relative to that of foamed urethane- or EPDM-based materials. The mechanical properties may be determined by conventional techniques, which are not discussed in detail herein.

The foamed protective material may be used alone as the protective article or as part of a multilayer protective article of the aerospace structure. The protective article may provide protection against flight, natural, and/or threat environments to the aerospace structure. If the foamed protective material is used alone, one or more of the additives may be used to provide the desired mechanical strength, thermal ablation resistance, and reflectivity properties to the protective article. If the foamed protective material is used as part of the multilayer protective article, the foamed protective material may provide one or more of the mechanical strength, thermal ablation resistance, or reflectivity properties, while other materials of the multilayer protective article provide other properties. Alternatively, the foamed protective material in the multilayer protective article may additionally provide one or more of the mechanical strength, thermal ablation resistance, and reflectivity properties if the protective article is anticipated to be exposed to severe environmental conditions or severe threat environments. Therefore, desired properties of the protective article may be tailored by appropriately selecting the additives in the precursor composition as well as by configuring the foamed protective material as the single layer protective article or as the multilayer protective article.

The multilayer protective article may be a composite material or composite structure that includes two or more plies of material or ply layers included a reinforcing material (e.g., reinforcing fibers) in at least some matrix material, which plies may be laid up on a tool one at a time and/or multiple layers at the same time. The plies or layers can be made of any materials with fibers (or plies) that exhibit desired characteristics including, but not limited to, pre-preg material and/or dry fiber material. The pre-preg material and the dry fiber material can include, but are not limited to, unidirectional tapes, bias tapes, woven fabrics, non-woven fabrics, and non-crimp fabrics. The orientation of the fibers (or plies) may also vary throughout the multilayer protective article. Each of the plies or layers may provide different protective properties to the aerospace structure. The multilayer protective article may include only those materials that protect against threats with which the aerospace structure is anticipated to encounter.

Figure 1:
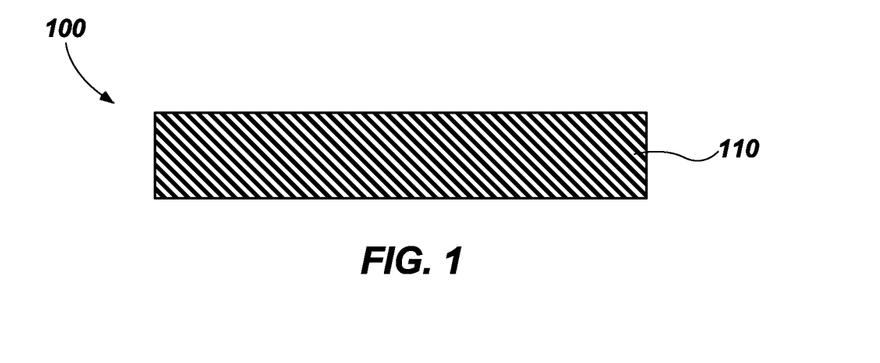
FIGS. 1-4 are schematic cross-sectional views of protective articles according to some embodiments of the disclosure.
Figure 2:
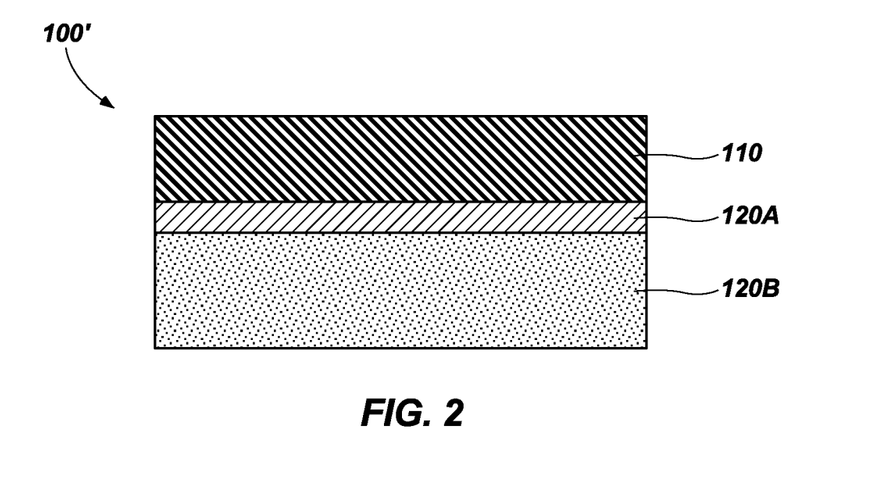
Figure 3:
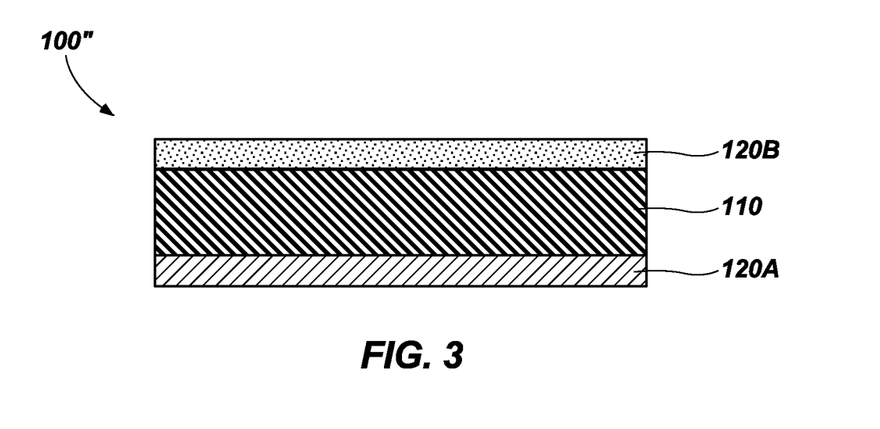
Figure 4:
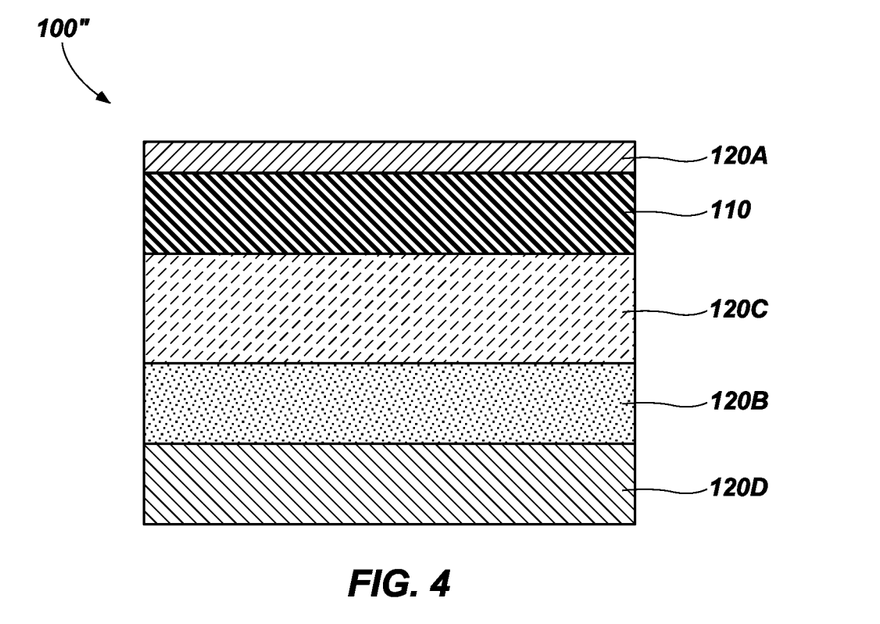

FIG. 1 is a cross-sectional view of a protective article 100 including a single layer of a foamed protective material 110 according to embodiments of the disclosure. FIG. 2 is a cross-sectional view of a multilayer protective article 100' including the foamed protective material 110 according to embodiments of the disclosure with additional materials 120A, 120B adjacent to the foamed protective material 110, such as adjacent to one surface of the foamed protective material 110. FIGS. 3 and 4 are cross-sectional views of multilayer protective articles 100" including the foamed protective material 110 according to embodiments of the disclosure between the additional materials 120A, 120B. In FIG. 3, the foamed protective material 110 is positioned directly between the materials 120A, 120B. Additional materials 120C, 120D (not shown in FIG. 3) may, optionally, be adjacent to surfaces of one of the materials 120A, 120B. In FIG. 4, the foamed protective material 110 is positioned between materials 120A, 120B, with additional material 120C below the foamed protective material 110 and additional material 120D below the material 120B. While FIGS. 3 and 4 illustrate the protective article 100" as having three material layers or five material layers, any number of materials may be present depending on the desired properties of the protective article 100". While FIG. 3 illustrates the foamed protective material 110 between the materials 120A, 120B, one or more of the materials 120C, 120D may optionally intervene between the foamed protective material 110 and the materials 120A, 120B. The materials 120A-120D may be the same as one another or different from one another depending on the desired properties of the protective article 100". The materials 120A-120D may be appropriately selected to provide one or more of radiation protection, ballistic protection, electrical charge protection, and/or thermal radiation protection properties to the protective article 100". Additionally, the order of the materials 120A-120D may vary depending on the desired properties of the protective article 100", and relative thicknesses of the foamed protective material 110 and the materials 120A-120D may vary depending on the desired properties of the protective article 100". The materials 120A-120D may include a particle-matrix composite material, fibers embedded in a polymeric matrix, a metallic mesh, a metal alloy mesh, a metallic material in a polymeric matrix, or other materials as described in U.S. patent application Ser. No. 16/103,428.

In addition to providing other protective properties to the protective article 100', 100", the materials 120A, 120B or 120A-120D enable the foamed protective material 110 to be included in the protective article 100', 100" without the foamed protective material 110 exhibiting curvature. The protective article 100" may, therefore, be substantially planar. By way of example only, the materials 120A, 120B may include fibers, such as para-aramid synthetic fibers (e.g., KEVLAR®), carbon fibers, and/or boron fibers, within a matrix to provide increased thermal ablation resistance to the protective article 100" while the foamed protective material 110 has a lower thermal ablation resistance. The matrix of the other materials 120A, 120B may be a polymeric material, such as AEM, a silicone rubber, or EPDM rubber, or a styrene block-based thermoplastic elastomer.

The protective article 100, 100', 100" may be applied to an external surface of the aerospace structure by conventional techniques. The protective article 100, 100', 100" including the foamed protective material 110 may be joined (e.g., bonded, mechanically interlocked) to one or more components (not shown) of the aerospace structure. The foamed protective material 110 may be compatible with the other components of the aerospace structure. The aerospace structure may include a vehicle configured for flight, such as an aircraft or a spacecraft. Examples of aerospace structures in which the protective article 100, 100', 100" may be used include, but are not limited to, a satellite, a rocket-based vehicle, a missile, a rocket motor, or other movable or stationary vehicle or device used in an environment in which thermal protection or protection against the thermal environment or threat environment is desired. The protective article 100, 100', 100" may be applied to at least a portion of the external surface of the aerospace structure or to substantially all of the external surface of the aerospace structure depending on the flight, natural, and/or threat environments to which the aerospace structure is expected to be exposed. The external surface of the aerospace structure may be exposed to one or more of the flight, natural, or threat environments during use and operation.

Figure 5A:
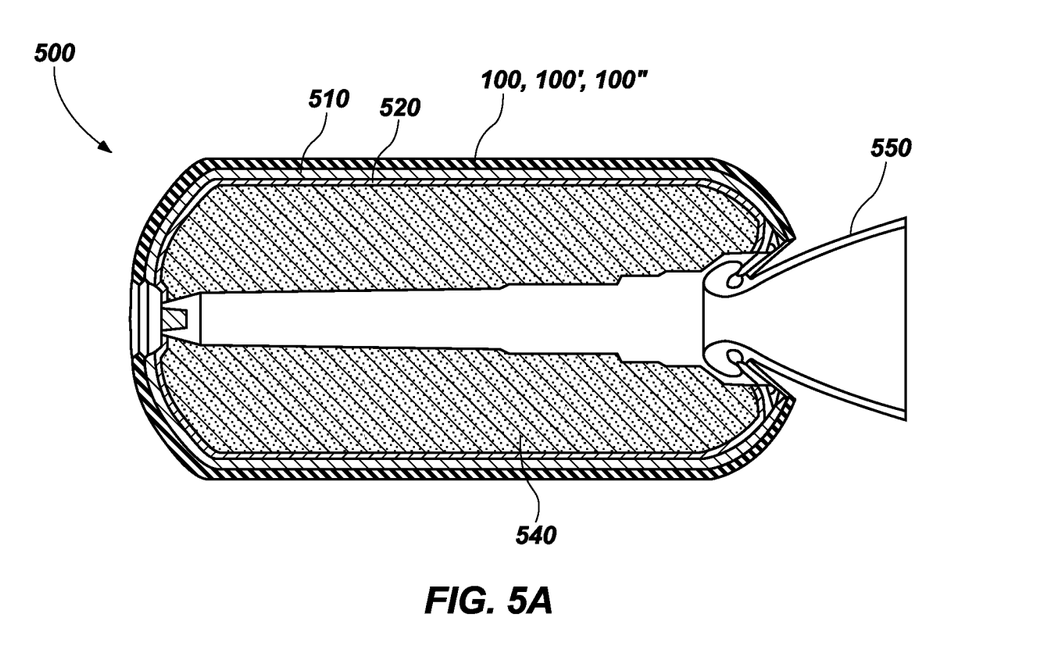
FIGS. 5A and 5B are simplified cross-sectional views of a rocket motor including one or more protective articles according to embodiments of the disclosure.
Figure 5B:
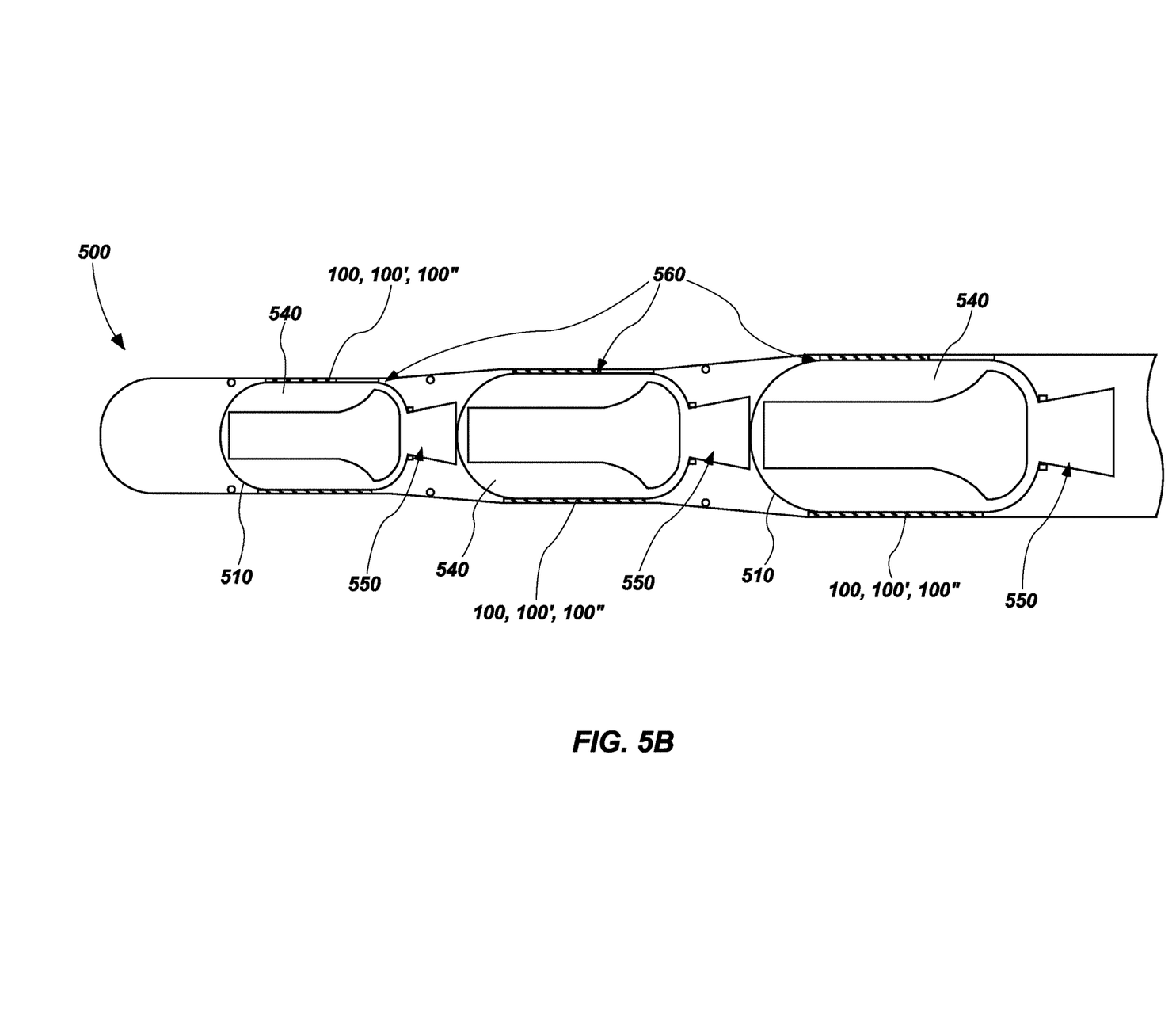

The aerospace structure may, for example, be a rocket motor 500 including the protective article 100, 100', 100", as shown in FIG. 5A. The protective article 100, 100', 100" may be applied to the external surface of a casing 510 of the rocket motor 500. While FIG. 5A shows the protective article 100, 100', 100" as being applied to substantially all of the casing 510, the protective article 100, 100', 100" may be applied to just a portion of the casing 510. The rocket motor 500 may include an assembly comprising the casing 510, an insulation material 520, an optional liner (not shown), a propellant structure 540 (e.g., a solid propellant such as a double-base propellant, an HTPB-based propellant, etc.), and a nozzle assembly 550. The nozzle assembly 550 may be cooperatively associated with the casing 510 and the propellant structure 540 so as to produce a desired thrust during use and operation of the rocket motor 500. The rocket motor 500 may further include an igniter (not shown) that may be activated to ignite the propellant structure 540. The rocket motor 500 may, alternatively, be configured to be a component (e.g., a stage) of a larger assembly (e.g., a multi-stage rocket motor assembly), as shown in FIG. 5B. The rocket motor 500 may include multiple stages 560 that are configured in an end-to-end relationship with one another. While FIG. 5B shows the protective article 100, 100', 100" as being applied to a portion of the casing 510, the protective article 100, 100', 100" may be applied to substantially all of the casing 510. Suitable configurations (e.g., components, component shapes, component sizes, component materials, component arrangements, etc.) for the rocket motor 500 are well known in the rocket motor art and, therefore, are not described in detail herein.

During use and operation, the protective article 100, 100', 100" protects the aerospace structure, such as the rocket motor 500 to survive the flight environment, natural environment, and/or the threat environment. By way of example only, the aerospace structure may survive one or more of rain, birds, lightning strikes (e.g., electrostatic pulses), rocks, dirt, micro-meteoroids, dust, erosion, ballistic impact, harmful radiation, thermal flash, directed energy attacks, electromagnetic pulses, and/or other threats.

For the protective article 100 including the foamed protective material 110 as a single layer, the protective article 100 may be joined with the component(s) of the aerospace structure by bonding or otherwise attaching the foamed protective material 110 to the other components. The foamed protective material 110 and the other components may be joined by conventional adhesive bonding or by a vulcanization process. Alternatively, the foamed protective material 110 may be joined to polymer-based composite structures by a co-curing process in which the calendared precursor composition (e.g., the precursor composition in a substantially unfoamed state) is applied to the component(s) and then foamed and cured, to substantially simultaneously join the foamed protective material 110 and the component(s) of the aerospace structure. The co-curing process may simultaneously cure and bond the foamed protective material 110 and the component(s) of the aerospace structure. The calendared precursor composition may be substantially uncured, partially uncured, or a majority uncured before the foaming act and the curing act are conducted to substantially simultaneously join the foamed protective material 110 and the component(s) of the aerospace structure. The calendared precursor composition may, thus, be foamed in situ and co-cured to the component(s) of the aerospace structure without conducting additional process acts and without utilizing an adhesive material. The co-curing process minimizes process acts and creates a solid, free standing material that may be bonded to the component(s). The co-curing process produces a chemical bond between the protective article 100 and the component(s) of the aerospace structure. The co-curing process may be conducted in an autoclave or oven of sufficient size to contain the aerospace structure. In some embodiments, the aerospace structure may be heated in the autoclave or oven to a temperature of up to about 400° F. (about 204° C.). Accordingly, the protective article 100 has a higher interfacial strength and is less susceptible to separating (e.g., delaminating, failing) due to interactions with the environment in which the aerospace structure is exposed during use compared to aerospace structures formed by conventional co-bonding or adhesive bonding processes.

For the multilayer protective article 100', 100", the foamed protective material 110 and two or more of the materials 120A-120D may be joined with one another to form the protective articles 100', 100", followed by joining the protective articles 100', 100" to the one or more components of the aerospace structure. The protective articles 100', 100" may, thus, be a solid material, before being joined with the component(s) of the aerospace structure. Alternatively, the calendared precursor composition (e.g., the precursor composition in a substantially unfoamed state) and the two or more of materials 120A-120D may be joined and applied to the component(s) before conducting the foaming act and curing act, forming the foamed protective material 110 and joining the foamed protective material 110 and the component(s) of the aerospace structure by the co-curing process. The calendared precursor composition may be substantially uncured, partially uncured, or a majority uncured before the foaming act and the curing act are conducted to substantially simultaneously join the foamed protective material 110 and the component(s) of the aerospace structure. The calendared precursor composition may, thus, be foamed in situ and co-cured to the component(s) of the aerospace structure without conducting additional process acts and without utilizing an adhesive material. Accordingly, the protective article 100', 100" has a higher interfacial strength and is less susceptible to separating (e.g., delaminating, failing) due to interactions with the environment in which the aerospace structure is exposed during use compared to aerospace structures formed by conventional co-bonding or adhesive bonding processes.

The following examples serve to explain embodiments of the disclosure in more detail. These examples are not to be construed as being exhaustive or exclusive as to the scope of this disclosure.

EXAMPLES

Example 1

Compositions including the ingredients in Table 1 were prepared by combining the ingredients in the amounts listed to form Compositions 1A-1D.

TABLE 1

Precursor Compositions of Compositions 1A-1D.

| Ingredient | Composition 1A (wt %) | Composition 1B (wt %) | Composition 1C (wt %) | Composition 1D (wt %) |
|---|---|---|---|---|
| VAMAC ® Ultra HT (rubber) | 73.53 | 70.18 | 72.2 | 70.18 |
| VANFRE ® VAM (processing aid) | 0.74 | 0.70 | 0.72 | 0.70 |
| NAUGARD ® 445 (antioxidant) | 0.74 | 0.70 | 0.72 | 0.70 |
| DI-CUP ® 40C (peroxide curing agent) | 3.68 | 3.51 | 3.61 | 3.51 |
| VANAX ® MBM (HVA-2) (peroxide cure accelerator) | 1.47 | 1.40 | 1.44 | 1.40 |
| HI-SIL ® 233 (filler) | 14.71 | 14.04 | 14.44 | 0 |
| CAB-O-SIL ® M-7D (filler) | 0 | 0 | 0 | 14.04 |
| EXPANCEL ® 920 DU 120 (foaming agent) | 4.41 | 4.21 | 4.33 | 4.21 |
| HPS 11 (processing aid) | 0.74 | 0.70 | 0.72 | 0.70 |
| DIAK ® #1 (diamine curing agent) | 0 | 1.75 | 1.81 | 1.75 |
| DOTG (diamine cure accelerator) | 0 | 2.81 | 0 | 2.81 |

After forming the precursor compositions, each of Compositions 1A-1D were heated to a temperature of about 315° F. (about 157° C.) for 30 minutes, followed by a postcure at 350° F. (about 177° C.) to produce foamed articles.

Figure 6:
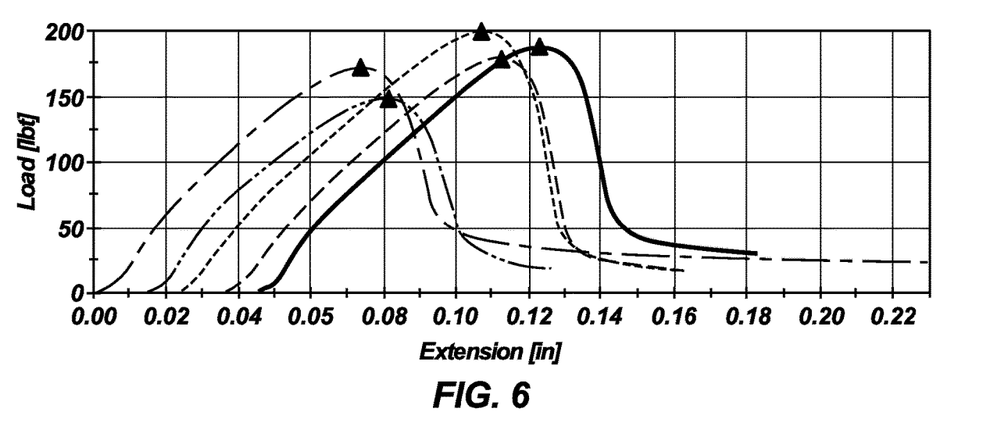
FIG. 6 is a graph showing tension properties of a protective article formed from a precursor composition according to some embodiments of the disclosure.

Thermal conductivity and mechanical properties of the foamed articles were measured by conventional techniques. The foamed articles exhibited good thermal conductivity, high tear strength, and high elongation. The foamed article formed from Composition 1A exhibited a maximum stress of about 180 psi (ranging between about 151 psi and about 202 psi) and exhibited good flatwise tension as shown in FIG. 6.

The foamed article formed from Composition 1A also exhibited a similar tear strength to P50 cork (commercially available from Amorim Cork Composites (Mozelos, Portugal)) when corrected for density. Tested coupons of the foamed article formed from Composition 1A exhibited a tear strength of 5.48 N/mm and 14.96 N/mm when normalized for density. In comparison, the P50 Cork exhibited a tear strength of 7.99 N/mm and 15.98 N/mm when normalized for density. The tear strength of the compositions according to embodiments of the disclosure was equivalent to that of P50 cork at a similar density. The elongation at failure for the foamed article formed from Composition 1A was 11.1 mm and for the P50 cork was 1.74. The foamed article formed from Composition 1A was approximately five times tougher than the P50 cork based on the elongation data.

Example 2

The precursor composition of Composition 1A was formed as described above and calendared into sheets. The as-formed sheets of Composition 1A had a density of 1.0 g/ml. The sheets of Composition 1A were placed between solid plates spaced apart varying distances, and then foamed as described above to produce foamed articles of different densities. When foamed, the as-formed sheets of Composition 1A expanded to fill the spaces between the solid plates.

Figure 7:
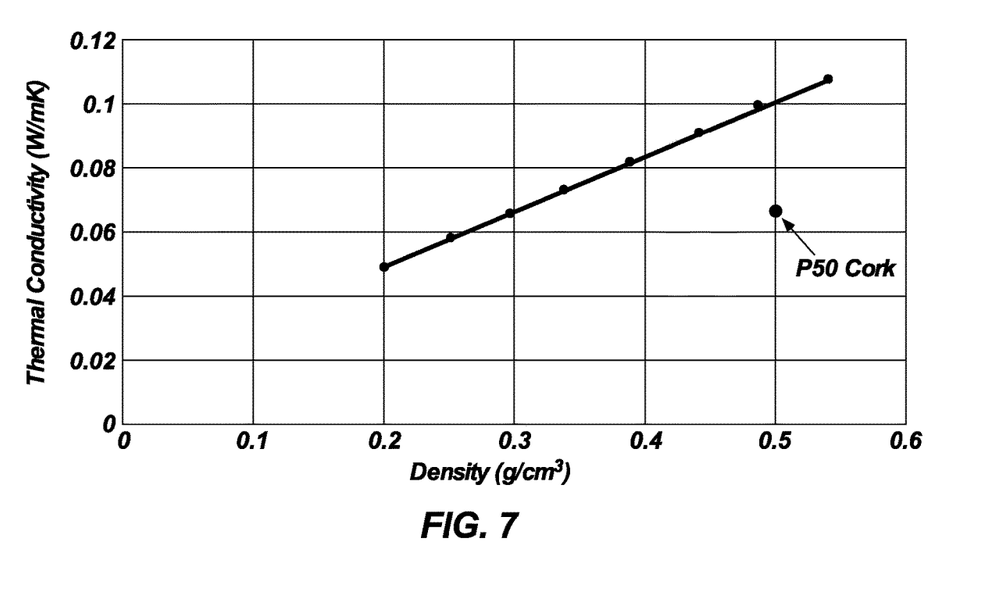
FIG. 7 is a graph showing thermal conductivity versus density of a protective article formed from a precursor composition according to some embodiments of the disclosure.

Thermal conductivity properties of each of the foamed articles was measured by conventional techniques. The thermal conductivity of each of the foamed articles as a function of density is shown in FIG. 7. For comparison, the density of P50 Cork (commercially available from Amorim Cork Composites (Mozelos, Portugal)) is also shown in FIG. 7. The thermal conductivity of each of the compositions according to embodiments of the disclosure is better than that of the engineered cork-based material P50. As shown in FIG. 7, the composition according to embodiments of the disclosure and exhibiting a density of about 0.5 g/ml has a greater thermal conductivity than the thermal conductivity of the engineered cork-based material P50, which had a density of 0.5 g/ml.

Example 3

Compositions including the ingredients in Table 2 were prepared by combining the ingredients in the amounts listed to form Compositions 1A and 1E-1G. Composition 1A was the same as in Table 1 and Compositions 1E-1G included the same ingredients as Composition 1A except that the amount of foaming agent was varied to determine the effects on density.

TABLE 2

Precursor Compositions with Varying Amounts of Foaming Agent.

| Ingredient | Composition 1A (wt %) | Composition 1E (wt %) | Composition 1F (wt %) | Composition 1G (wt %) |
|---|---|---|---|---|
| VAMAC ® Ultra HT | 73.53 | 73.53 | 73.53 | 73.53 |
| VANFRE ® VAM | 0.74 | 0.74 | 0.74 | 0.74 |
| NAUGARD ® 445 | 0.74 | 0.74 | 0.74 | 0.74 |
| DI-CUP ® 40C | 3.68 | 3.68 | 3.68 | 3.68 |
| VANAX ® MBM (HVA-2) | 1.47 | 1.47 | 1.47 | 1.47 |
| HI-SIL ® 233 | 14.71 | 14.71 | 14.71 | 14.71 |
| EXPANCEL ® 920 DU 120 | 4.41 | 6 | 8 | 10 |
| HPS 11 | 0.74 | 0.74 | 0.74 | 0.74 |

After forming the precursor compositions, each of Compositions 1A and 1E-1G was heated to a temperature of about 315° F. (about 157° C.) for 30 minutes, followed by a post-cure at 350° F. (about 177° C.) to produce foamed articles. The concentration of foaming agent, process conditions, and density for each of Compositions 1A and 1E-1G is shown below in Table 3. The density was measured by conventional techniques.

TABLE 3

Density of Foamed Articles formed from Precursor Compositions Including Varying Amounts of Foaming Agent.

| Composition | Foaming Agent (wt %) | Process | Density (g/ml) |
|---|---|---|---|
| AEM[1] | 0 | 250° F., 60 min | 1.05 |
| P50 Cork[2] | n/a | n/a | 0.48-0.52 |
| Composition 1A | 4 | 315° F., 30 min, post-cure 350° F. | 0.3-0.5 |
| Composition 1E | 6 | 315° F., 30 min, post-cure 350° F. | 0.15-0.5 |
| Composition 1F | 8 | 315° F., 30 min, post-cure 350° F. | 0.25-0.5 |
| Composition 1G | 10 | 315° F., 30 min, post-cure 350° F. | 0.3-0.5 |

[1]Commercially available as VAMAC ® Ultra HT from DuPont (Wilmington, DE)
[2]Commercially available as P50 Cork from Amorim Cork Composites (Mozelos, Portugal)

As shown in Table 3, the density of each of Compositions 1A, 1E, 1F, and 1G was less than or comparable to the density of the commercially available, engineered cork-based material P50 conventionally used in aerospace structures.

While the disclosed structures and methods are susceptible to various modifications and alternative forms in implementation thereof, specific embodiments have been shown by way of example in the drawings and have been described in detail herein. However, it should be understood that the disclosure is not limited to the particular forms disclosed. Rather, the present invention encompasses all modifications, combinations, equivalents, variations, and alternatives falling within the scope of the disclosure as defined by the following appended claims and their legal equivalents.

What is claimed is:

1. A precursor composition comprising, before cure:
a primary polymer in an amount of from about 65.0% by weight to about 80.0% by weight based on a total weight of the precursor composition, wherein the primary polymer is an acrylic ethylene monomer (AEM);
a foaming agent comprising expandable microspheres;
a strengthening additive in an amount of from about 2% by weight to about 20% by weight based on the total weight of the precursor composition, wherein the strengthening additive comprises one or more of chopped polyaramid fibers, nanotubes, platelets, rods, or disks of one or more of carbon, glass, metal, or ceramic;
a peroxide curing agent and a peroxide cure accelerator, and
one or more additional additives comprising a thermal ablation additive, an x-ray absorption additive, or a reflectivity additive,
wherein the precursor composition is free of an amine curing agent.

2. The precursor composition of claim 1, wherein the expandable microspheres are in an unexpanded form.

3. The precursor composition of claim 1, wherein the acrylic ethylene monomer comprises a terpolymer of ethylene, an alkyl acrylate, and an acidic cure site monomer.

4. The precursor composition of claim 1, wherein the peroxide cure accelerator comprises N,N'-m-phenylenedimaleimide.

5. The precursor composition of claim 1, wherein the foaming agent is present in an amount of from about 2% by weight to about 20% by weight based on the total weight of the precursor composition.

6. The precursor composition of claim 1, wherein the strengthening additive comprises the chopped polyaramid fibers.

7. The precursor composition of claim 1, wherein the one or more of nanotubes, platelets, rods, or disks, of one or more of carbon, glass, metal, or ceramic comprise one or more of carbon nanotubes, graphene, carbon black, fumed silica, or precipitated silica.

8. The precursor composition of claim 1, wherein the reflectivity additive comprises boron nitride, titanium oxide, or combinations thereof.

9. The precursor composition of claim 1, wherein the strengthening additive is present in an amount of from about 6.0% by weight to about 16.0% by weight based on the total weight of the precursor composition.

10. The precursor composition of claim 1, wherein the precursor composition comprises the AEM, the expandable microspheres, the chopped polyaramid fibers, precipitated silica, 4-(1-methyl-1-phenylethyl)N-[4-(1-methyl-1-phenylethyl)phenyl] aniline, polyoxyethylene octadecyl, and one or more fatty acid phosphate derivatives.

11. The precursor composition of claim 1, wherein the strengthening additive further comprises chopped fibers of one or more of carbon, aramid, glass, metal, quartz, or ceramic.

12. The precursor composition of claim 1, wherein the foaming agent is present in an amount of from about 2.8% by weight to about 7.4% by weight based on the total weight of the precursor composition.

13. A protective article, comprising:
a foamed protective material comprising a reaction product of a precursor composition comprising:
a primary polymer in an amount of from about 65.0% by weight to about 80.0% by weight based on a total weight of the precursor composition, wherein the primary polymer is an acrylic ethylene monomer (AEM);
expanded microspheres;
a strengthening additive in an amount of from about 2% by weight to about 20% by weight based on the total weight of the precursor composition, wherein the strengthening additive comprises one or more of nanotubes, platelets, rods, or disks of one or more of carbon, glass, metal, or ceramic;
a peroxide curing agent and a peroxide cure accelerator; and
one or more additional additives comprising a thermal ablation additive, a reflectivity additive, or an x-ray absorption additive;
wherein the precursor composition is free of an amine curing agent; and
wherein the foamed protective material exhibits a density of from about 0.1 g/ml to about 1.0 g/ml.

14. The protective article of claim 13, wherein the reaction product comprises a crosslinked AEM material surrounding the expanded microspheres.

15. The protective article of claim 14, wherein the foamed protective material comprises substantially uniformly distributed cells.

16. The protective article of claim 13, wherein the foamed protective material exhibits a density of from about 0.1 g/ml to about 0.5 g/ml.

17. The protective article of claim 13, wherein the foamed protective material exhibits a density of from about 0.5 g/ml to about 1.0 g/ml.

18. The protective article of claim 13, further comprising one or more materials adjacent the foamed protective material.

19. An aerospace structure comprising:
a protective article on at least a portion of an external surface of an aerospace structure, the protective article comprising a foamed protective material comprising a reaction product of a precursor composition comprising:
a primary polymer in an amount of from about 65.0% by weight to about 80.0% by weight based on a total weight of the precursor composition, wherein the primary polymer is an acrylic ethylene monomer (AEM);
expandable microspheres;
a strengthening additive in an amount of from about 2% by weight to about 20% by weight based on the total weight of the precursor composition, wherein the strengthening additive comprises one or more of nanotubes, platelets, rods, or disks of one or more of carbon, glass, metal, or ceramic;
a peroxide curing agent and a peroxide cure accelerator; and
one or more additional additives comprising a thermal ablation additive, a reflectivity additive, or an x-ray absorption additive; and
wherein the precursor composition is free of an amine curing agent.

20. The aerospace structure of claim 19, wherein the protective article comprises a single layer of the foamed protective material.

21. The aerospace structure of claim 19, wherein the protective article comprises a multilayer protective article.

22. A method of forming a protective article, comprising:
forming a precursor composition comprising:
a primary polymer in an amount of from about 65.0% by weight to about 80.0% by weight based on a total weight of the precursor composition, wherein the primary polymer is an acrylic ethylene monomer (AEM);
a foaming agent comprising expandable microspheres;
a strengthening additive in an amount of from about 2% by weight to about 20% by weight based on the total weight of the precursor composition, wherein the strengthening additive comprises one or more of nanotubes, platelets, rods, or disks of one or more of carbon, glass, metal, or ceramic;
a peroxide curing agent and a peroxide cure accelerator; and
one or more additional additives comprising a thermal ablation additive, a reflectivity additive, or an x-ray absorption additive;
wherein the precursor composition is free of an amine curing agent; and exposing the precursor composition to heat to form a foamed protective article.

23. The method of claim 22, wherein exposing the precursor composition to heat comprises substantially simultaneously crosslinking the AEM and foaming the precursor composition.

24. The method of claim 22, wherein exposing the precursor composition to heat comprises foaming the precursor composition and subsequently crosslinking the precursor composition.

25. The method of claim 22, wherein exposing the precursor composition to heat comprises exposing the precursor composition to a temperature between about 121° C. and about 232° C.

26. The method of claim 22, wherein exposing the precursor composition to heat comprises exposing the precursor composition to a first temperature to foam the precursor composition and exposing the precursor composition to a second temperature to crosslink the precursor composition.

* * * * *

UNITED STATES PATENT AND TRADEMARK OFFICE
CERTIFICATE OF CORRECTION

| | |
|---|---|
| PATENT NO. | : 11,999,834 B2 |
| APPLICATION NO. | : 16/446038 |
| DATED | : June 4, 2024 |
| INVENTOR(S) | : Cameron Hilton et al. |

It is certified that error appears in the above-identified patent and that said Letters Patent is hereby corrected as shown below:

In the Specification

| | | |
|---|---|---|
| Column 6, | Line 39, | change "diphenyloxide-4,4-disulphohydrazide," to --diphenyloxide-4, 4-disulphohydrazide,-- |
| Column 7, | Line 65, | change "CAB-0-SIL® M-7D." to --CAB-O-SIL® M-7D.-- |
| Column 9, | Line 6, | change "MBM HVA 2, By way" to --MBM HVA 2. By way-- |

In the Claims

| | | | |
|---|---|---|---|
| Claim 1, | Column 18, | Lines 53-54, | change "cure accelerator, and" to --cure accelerator; and-- |

Signed and Sealed this
Twenty-third Day of July, 2024

Katherine Kelly Vidal
*Director of the United States Patent and Trademark Office*